United States Patent [19]
Rappe

[11] Patent Number: 4,671,351
[45] Date of Patent: Jun. 9, 1987

[54] FLUID TREATMENT APPARATUS AND HEAT EXCHANGER

[75] Inventor: Gerald C. Rappe, Boulder, Colo.

[73] Assignee: VerTech Treatment Systems, Inc., Denver, Colo.

[21] Appl. No.: 755,880

[22] Filed: Jul. 17, 1985

[51] Int. Cl.$^4$ .......................... F28F 13/18; F28D 7/12; C02F 1/68
[52] U.S. Cl. .................... 165/133; 165/135; 165/142; 165/45; 165/155; 210/170; 210/177; 210/761
[58] Field of Search ............... 165/133, 142, 135, 45, 165/155, 47; 210/761, 762, 177, 178, 170

[56] References Cited
U.S. PATENT DOCUMENTS

| 2,665,249 | 1/1954 | Zimmerman | 210/761 |
|---|---|---|---|
| 2,665,556 | 1/1954 | Otten | 165/135 |
| 2,730,337 | 1/1956 | Roswell | 165/135 |
| 2,932,613 | 4/1960 | Huesler et al. | 210/761 |
| 3,449,247 | 6/1969 | Bauer | 210/761 |
| 3,606,999 | 9/1971 | Lawless | 210/761 |
| 3,853,759 | 12/1974 | Titinas | 210/761 |
| 4,230,178 | 10/1980 | Braat et al. | 165/142 |
| 4,272,383 | 6/1981 | McGrew | 210/761 |
| 4,574,875 | 3/1986 | Rawlings et al. | 165/142 |

FOREIGN PATENT DOCUMENTS

| 3029753 | 2/1982 | Fed. Rep. of Germany | 165/45 |
|---|---|---|---|
| 3033255 | 3/1982 | Fed. Rep. of Germany | 165/45 |
| 3047708 | 7/1982 | Fed. Rep. of Germany | 165/45 |
| 0042315 | 10/1980 | Japan | 165/133 |

Primary Examiner—William R. Cline
Assistant Examiner—John K. Ford
Attorney, Agent, or Firm—Cullen, Sloman, Cantor, Grauer, Scott & Rutherford

[57] ABSTRACT

The heat exchanger, which forms a part of the fluid treatment apparatus of this invention, includes an insulated tubular having concentric telescopically nested spaced tubes, wherein the space between the tubes is sealed and filled with an inert gas. The surfaces of the tubes are coated with a hydrogen permeation barrier preferably comprising an aluminum-iron alloy, nickel or copper which limits atomic hydrogen permeation into the space between the tubes, which would combine to form hydrogen gas and result in heat loss. The insulated tubular is telescopically nested in a pipe, forming a fluid heat exchanger and the heat exchanger is telescopically nested in fluid waste circulation pipes, forming the fluid treatment apparatus of this invention. The preferred fluid heat exchanger is a vertically extending deep well reactor suitable for wet oxidation reaction of fluid wastes including municipal sludge.

6 Claims, 2 Drawing Figures

FLUID TREATMENT APPARATUS AND HEAT EXCHANGER

BACKGROUND OF THE INVENTION

1. Field of the Invention

This invention relates to an improved insulated tubular and heat exchanger and a continuous fluid treatment apparatus such as may be used in down-hole wet oxidation of fluid waste streams, including municipal sludge.

2. Description of the Prior Art

Above ground wet oxidation systems have been in use for several years with limited success for the treatment of municipal sludge received from a sewage treatment process. The above-ground wet oxidation systems use high surface pressure and heat to initiate the wet oxidation reaction, however, the apparatus is not energy efficient, the system is subject to failure and results in only partial oxidation of the sludge; see for example, U.S. Pat. No. 2,665,249 of Zimmermann and U.S. Pat. No. 2,932,613 of Huesler, et al. The above ground wet oxidation processes have not therefore replaced the traditional methods of treating municipal sludge, which includes settling, dewatering, drying, incineration and the like.

Various vertical or down-hole fluid treatment systems have been proposed by the prior art but are used only in very limited applications. A down hole fluid treatment system utilizes vertical pipes which generally extend downwardly into the ground from a control station. The fluid to be treated is pumped into the vertical reactor pipes and the fluid head creates a pressure which assists in the desired fluid process or reaction. In the processes used to date, the reaction requires additional heat which may be added by electrical resistance coils or heated fluid which circulates in a heat exchanger. Air or other gases may be added to the fluid being treated to assist in the reaction.

Although several prior art patents propose a vertical well wet oxidation reaction system for treatment of municipal sludge or other fluid waste streams, the processes and apparatus disclosed in these patents have not been successful; see for exapmle U.S. Pat. No. 3,449,247. As recognized by these prior art patents, the pressure created by the fluid head is dependent upon the length of the reactor. Thus, it is theoretically possible to fully oxidize municipal sludge at a depth of approximately one mile provided the concentration of the oxidizable material in the municipal sludge is balanced against the oxygen available in the air injected into the system. To the applicant's knowledge, however, no one has been successful in building a down-hole wet oxidation system for municipal sludge except the assignee of the present invention.

U.S. Pat. No. 4,272,383 of Dr. McGrew, entitled "Method and Apparatus for Effecting Subsurface, Controlled, Accelerated Chemical Reactions", assigned to the assignee of the present invention, discloses the principles of the first successful down-hole wet oxidation reaction system for municipal sludge which is now operating on an experimental basis in Longmont, Colorado. The apparatus disclosed in the McGrew patent includes a series of generally concentric telescopically nested pipes or tubes wherein diluted municipal sludge is preferably received in the inner pipe and flows downwardly to a reaction zone adjacent the bottom of the pipe and recirculated upwardly through a second pipe, which surrounds the inner pipe, following the reaction. Compressed air is injected into the downwardly flowing sludge preferably in the form of Taylor-type gas bubbles. In the McGrew patent, the temperature of the reaction is controlled by a heat exchanger jacket which surrounds the inner concentric pipes wherein heated oil or other heat exchange fluid is pumped into the jacket to control the temperature of the reaction zone.

The fluid treatment apparatus of this invention preferably utilizes a centrally located heat exchanger wherein the fluid to be treated is contained within recirculating pipes which surround the heat exchanger, resulting in better control of the temperature of the reaction zone and more efficient heating of the fluid to be treated. The center downcomer pipe of the heat exchanger is preferably an insulated tubular which comprises two concentric pipes or tubes telescopically nested in spaced relation wherein the space between the tubes is sealed and preferably filled with an inert gas. As will be understood, the pipes and insulated tubular used in the fluid treatment apparatus of this invention comprises a series of pipes interconnected in a vertical string to accommodate the length of the overall fluid treatment apparatus. Insulated tubulars have been used in the oil well industry and other industries for several years to transfer heated fluids and gases. As set forth hereinbelow, however, the fluid treatment apparatus of this invention requires localizing the heat as much as possible in the reaction zone located adjacent the bottom of the pipes. The heated oil or other heat transfer fluid is received at the top of the apparatus or ground level. Thus, radial heat losses through the insulated tubular to the recirculated heat transfer fluid must be minimized. It has now been found that a substantial heat loss results from atomic hydrogen permeation into the space between the tubes of the insulated tubular which recombines to form gaseous hydrogen. There is therefore a need to develop an improved insulated tubular which inhibits hydrogen permeation to improve the insulation qualities of the insulated tubular which results in an improved heat exchanger and fluid treatment apparatus of the type disclosed herein.

SUMMARY OF THE INVENTION

As described, the heat exchanger and insulated tubular of this invention is particularly, although not exclusively, adapted to utilization in a fluid treatment apparatus for continuous treatment of fluid waste at elevated temperatures and pressures, such as down-hole fluid treatment apparatus including wet oxidation of municipal sludge and other fluid wastes. The preferred heat exchanger includes an elongated insulated tubular preferably having an open end which is generally concentric with and telescopically nested in a second pipe preferably having a closed end adjacent the open end of the surrounding pipe to communicate with the insulated tubular. The insulated tubular includes a first inner tube and a second outer tube which is preferably generally concentric with and surrounds the first tube in spaced relation. The space between the first and second tubes is preferably sealed and filled with an inert gas, such as argon, helium or xenon. The heat transfer fluid such as oil is received in the first inner tube of the insulated tubular preferably at an elevated temperature. The heat transfer fluid then flows through the insulated tubular and returns through the annular space between the outer tube of the insulated tubular and the downcomer pipe containing fluid and oxidizing gas for heating and recirculation.

In the most preferred embodiment of the heat exchanger, the insulated tubular includes a hydrogen permeation barrier on the inner and outer surfaces of both tubes of the insulated tubular. The hydrogen permeation barrier is preferably formed by coating the inner and outer surfaces of the tubes with aluminum, nickel or copper. The permeation barrier reduces the flow of atomic hydrogen into the space between the first and second tubes of the insulated tubular, thereby reducing heat losses from the hot transfer fluid in the center tube of the insulated tubular to the returning heat transfer fluid in the annular region whose inner surface is the outer surface of the insulated tubular. When the heat exchanger of this invention is submerged in a fluid, the heat transfer is concentrated in a reaction zone located adjacent the end of the heat exchanger, which is particularly advantageous in the down-hole fluid treatment apparatus of this invention. The elongated fluid heat exchanger is then surrounded by circulation pipes containing the fluid to be treated. The circulation pipes include a first pipe which telescopically surrounds the outer pipe of the heat exchanger in spaced relation which receives the fluid to be treated in contact with the outer pipe of the heat exchanger. A second pipe generally concentric with and surrounding the first pipe receives the treated fluid. The fluid to be treated, such as municipal sludge or other fluid waste is received between the outer pipe of the heat exchanger and the first pipe of the fluid circulation pipes. The fluid to be treated flows through the first pipe in contact with the heat exchanger and recirculates through the second outermost pipe. In this embodiment, the fluid treatment apparatus thus creates a fluid reaction zone adjacent the end of the fluid circulation pipes.

As described, the fluid treatment apparatus of this invention is particularly suitable for continuous treatment of fluid waste including municipal sludge and contaminated fluid waste at elevated temperatures and pressures. Where the fluid treatment apparatus is utilized to treat municipal sludge and other waste by wet oxidation, the fluid treatment apparatus comprises a plurality of elongated generally concentric and telescopically nested pipes which extend vertically into the ground as much as a mile or more in depth. The central insulated tubular, which receives the hot heat transfer fluid, preferably has an open end and the outer pipe of the heat exchanger preferably has a closed end adjacent the open end of the insulated tubular providing communication with the insulated tubular and continuous flow of the heat transfer fluid. The first pipe of the fluid circulation pipes, which surrounds the outer pipe of the heat exchanger, also has an open end and the outermost pipe may also have a closed end which communicates with the open end of the fluid circulation pipes, providing continuous circulation of the fluid to be treated. The heated reaction zone is thus located adjacent the bottom of the fluid circulation pipes and the pressure of the fluid head in the circulation pipes assures fluid reaction of the fluid waste at elevated temperatures and pressures in the reaction zone.

In the most preferred embodiment of the heat exchanger and fluid treatment apparatus of this invention, the hydrogen diffusion barrier is a diffusion coating of aluminum on the inner and outer surfaces of the concentric tubes of the insulated tubular, forming a surface "coating" of an iron-aluminum alloy. The iron-aluminum alloy coating has been found to be particularly effective in preventing diffusion of atomic hydrogen into the sealed space between the tubes. The diffusion barrier may also be formed by electroplating copper or preferably nickel on the surfaces of the tubes. As described, the diffusion of atomic hydrogen into the sealed space between the tubes of the insulated tubular results in an increased thermal conductivity and resultant increased radial heat losses from the heat transfer fluid flowing through the insulated tubular to the recirculating heat transfer fluid in the second outer pipe of the heat exchanger.

The method of forming an insulated tubular for use in a heat exchanger apparatus, as described, thus includes forming the telescopically nestable tubes, forming a hydrogen permeation barrier coating on the exterior and interior surfaces of the tubes and assembling the tubes in nested, concentric, telescopically spaced relation and sealing the space between the tubes. The space between the tubes is then evacuated and preferably filled with an inert gas. In the most preferred method of forming the insulated tubular of this invention, the hydrogen permeation barrier coating is formed by diffusion coating the interior and exterior surfaces of the tubes with aluminum, forming an iron-aluminum alloy on the surfaces. As described, the hydrogen permeation barrier may also be formed by electroplating the surfaces with nickel or the barrier may also be formed by electroplating copper on the surfaces.

Other advantages and meritorious features of this invention will be more fully understood from the following description of the preferred embodiments, the appended claims, and the drawings, a brief description of which follows.

DESCRIPTION OF THE PREFERRED EMBODIMENTS AND METHOD OF THIS INVENTION

Figure 1:
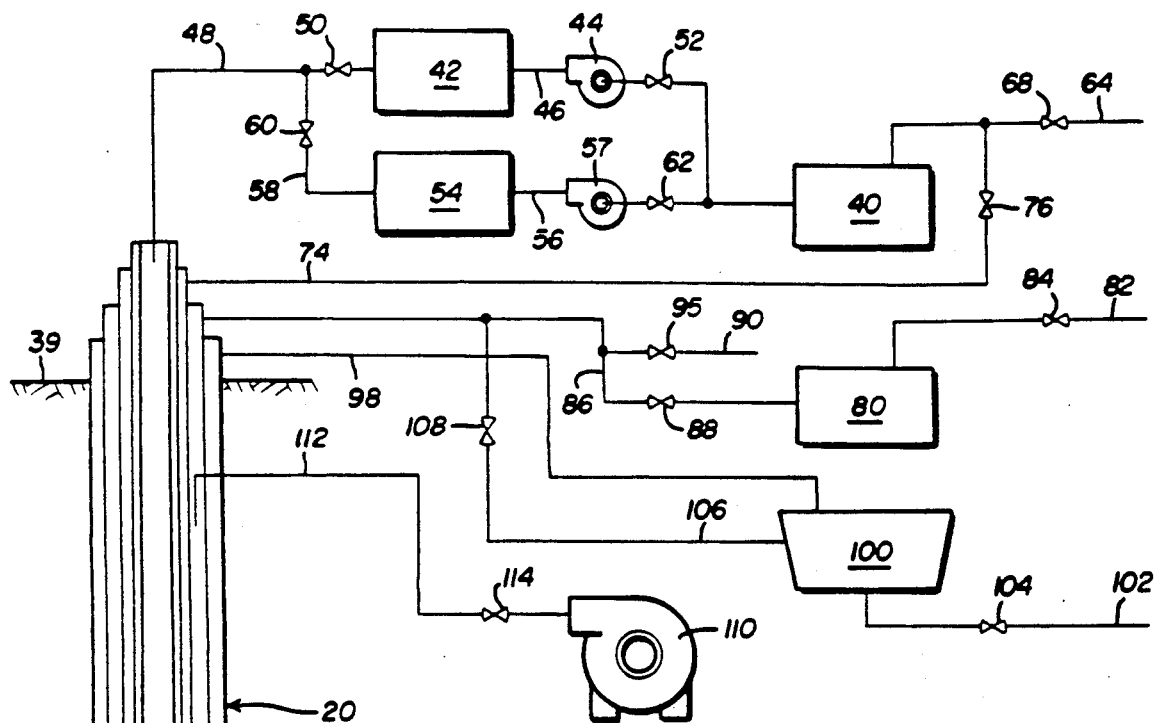
FIG. 1 is a schematic illustration of a preferred embodiment of the continuous fluid treatment apparatus of this invention.

The continuous fluid treatment apparatus 20 illustrated in the drawings is a vertical down hole fluid reaction apparatus suitable for treatment of various contaminated fluid wastes including wet oxidation treatment of municipal sludge. As disclosed in the above-referenced McGrew patent, the fluid treatment apparatus comrises a plurality of generally concentric and telescopically nested pipes which extend vertically into the ground. In a treatment apparatus for wet oxidation of municipal sludge, for example, the pipes may extend approximately one mile into the ground creating a very substantial pressure head. It will be understood, however, that the length of the pipes will depend upon the fluid being treated and the desired fluid reaction. The fluid treatment apparatus of this invention may also be used in various conversion reactions wherein a solid particulate is suspended in the circulating fluid. Further, the pipes or tubes are generally not continuous. Each pipe comprises a plurality of sections which are interconnected in serial alignment in a string, similar to the pipes in an oil well. In a typical municipal sludge wet oxidation application, the length of each pipe section is 40 feet long, the total length is about 5,200 feet and the flow rate of the fluid being treated is about 80 to 400 gallons per minute.

In the disclosed preferred embodiment of the fluid treatment apparatus of this invention, the fluid heat exchanger 22 is located at the center of the concentric pipes of the fluid treatment apparatus. The first or innermost pipe of the heat exchanger is an insulated tubular 24 having an open end 26. As described more fully hereinbelow, the insulated tubular reduces radial heat transfer from the downflowing heated heat transfer fluid in the insulated tubular to the recirculating upwardly flowing heat transfer fluid in the second pipe 28. As shown, the first pipe or insulated tubular 24 is generally concentric with and telescopically nested in second pipe 28 and the second pipe has a closed end 30 adjacent the open end 26 of the insulated tubular. The fluid to be treated is then circulated around the heat exchanger 22, as now described.

A third pipe 32, which is the first pipe of the outer fluid circulation piping, surrounds the heat exchanger 22 in generally concentric spaced telescopic relation. The third pipe 32 has an open end 34 adjacent the closed end 30 of the fluid heat exchanger. A fourth pipe 36 surrounds the third pipe 32 in generally concentric spaced telescopic relation and includes a closed end 38 adjacent the open end 34 of the third pipe 32. The fluid to be treated is circulated downwardly through pipe 32 in contact with the second pipe 28 of the heat exchanger 22 and the treated fluid then flows through the open end 34 of the third pipe 32 and upwardly through the fourth pipe 38 in contact with the outer surface of the third pipe 32. As described in the above-referenced McGrew patent, the fluid treatment apparatus creates a reaction zone adjacent the bottom of the apparatus wherein the fluid to be treated is reacted under heat and pressure. A principal object of the present invention is to concentrate the heat transferred from the heat exchanger to the fluid circulating in pipe 32 to the lower reaction zone, and reduce radial heat transfer, particularly in the upper portion of the heat transfer apparatus.

FIG. 1 illustrates schematically the above-ground components utilized in the fluid treatment apparatus and process. The heat transfer fluid, such as oil, is stored in a reservoir tank 40. The oil is heated in a heater 42, such as a conventional gas fired heater. The oil is pumped by pump 44 from reservoir 40 through line 46 to heater 42 and the rate of flow is controlled by valve 52. The heated oil is then transferred through line 48 and the rate of flow is controlled by valve 50. Where the fluid reaction is exothermic, such as a wet oxidation reaction, cooling of the reaction zone may be required where the heat of reaction exceeds the preferred temperature in the reaction zone. Thus, the disclosed apparatus includes a heat exchanger 54 where the oil may be cooled. The oil from reservoir 40 may be pumped through line 56 to the heat exchanger 54 by pump 57. The flow is controlled by line 62. The cooler oil is then discharged through line 58 and valve 60 to the supply line 48 of the fluid treatment apparatus.

Figure 2:
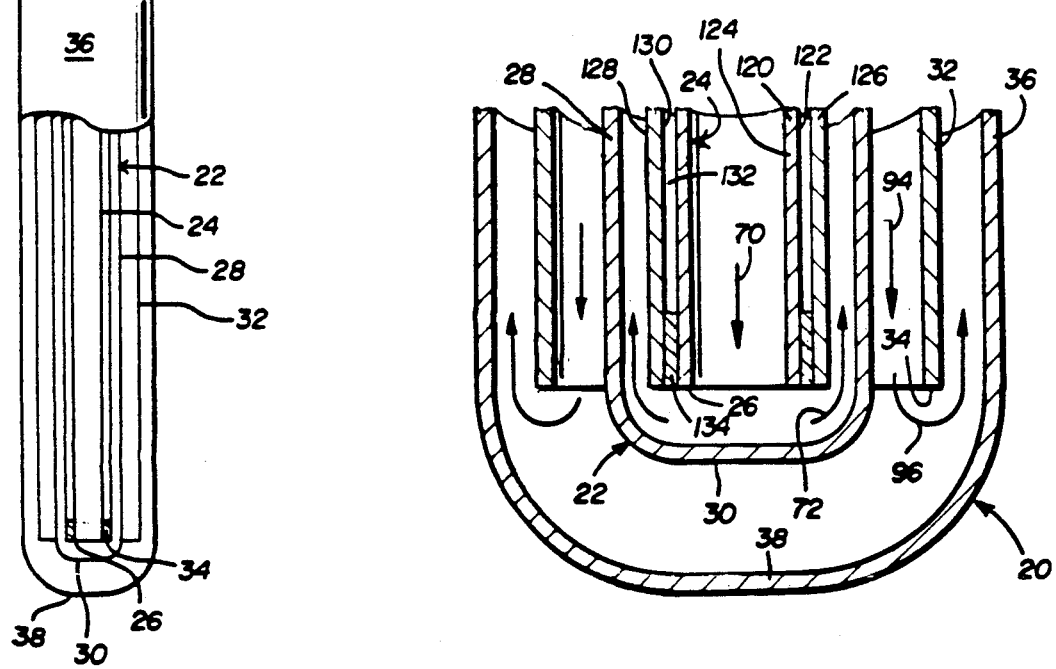
FIG. 2 is a cross-sectional view of the lower portion of the fluid treatment apparatus shown in FIG. 1.

Normally heated oil is then supplied through line 48 into the top of the insulated tubular 24. As best shown in FIG. 2, the heated oil then flows downwardly through the insulated tubular as shown by arrow 70. The oil then flows out of the open end 26 of the insulated tubular and the oil is recirculated upwardly through pipe 28 in contact with the tubular, as shown by arrow 72. The oil or other heat transfer fluid is then discharged from the top of pipe 28 through line 74, back to reservoir 40 through valve 76.

The fluid to be treated, such as contaminated industrial fluids, municipal sewage or the like is supplied to the top of pipe 32 and circulates around the heat exchanger 22 as described. As shown in FIG. 1, the fluid to be treated is stored in reservoir tank 80. As described in the above referenced McGrew patent, the fluid treatment apparatus is particularly suitable for treatment of municipal sludge received from a conventional municipal wastewater treatment plant. The sludge is received through line 82 and the flow is controlled by line 84. The fluid sludge is then delivered to the apparatus through line 86 and valve 88. The fluid sludge is preferably diluted with liquid effluent from municipal wastewater treatment plant delivered through line 90 and valve 92. The fluid sludge is preferably diluted to control the percentage of oxidizable material delivered to the fluid treatment apparatus. The diluted fluid sludge, fluid waste or other fluid to be treated then flows downwardly through pipe 32 in contact with the outer wall 28 of the heat exchanger 22 as shown by arrows 94. As described, pipe 32 has an open end 34 and the treated fluid then flows upwardly through the outer pipe 36 for discharge from the fluid treatment apparatus. As shown in FIG. 1, the treated fluid is discharged from pipe 36 through line 98 to tank 100. Where the apparatus is used for wet oxidation of fluid sludge, tank 100 is preferably a settling tank where the substantially inert ash is separated from the water. The ash may be drawn off through line 102 and the rate of flow is controlled by valve 104.

In a wet oxidation reactor, the supernatant may be drawn off through line 106 and used as a diluent in the process. As shown in FIG. 1, the supernatant is drawn off through line 106 and delivered to line 86 which communicates with pipe 32. The rate of flow and dilution is controlled by valve 108. As described in the above-referenced McGrew patent, air is injected into the down-flowing sludge in wet oxidation of municipal sludge and other waste materials. The air is preferably injected into the down-flowing stream of the fluid to be treated below the ground level 39 in the form of Taylor-type bubbles. It will also be understood that other fluid reactions may require other gases dependent upon the desired reaction. The disclosed apparatus therefore includes an air compressor 110 and the compressed air is delivered to the downward flowing fluid to be treated in pipe 32 below ground level by line 112 and the flow is controlled by valve 114. 110 may also be a pump delivering any gas required by the reaction occurring in the fluid treatment apparatus of this invention.

As described, the fluid treatment apparatus of this invention is primarily intended to treat fluid waste at elevated temperatures and pressures. The pressure is provided by the fluid head and the temperature is provided by the heat of reaction where the reaction is exothermic and the heat exchanger 22. In a typical wet oxidation reaction of municipal sludge, the bottom hole temperature is approximately 500 degrees Fahrenheit. Thus, the oil delivered to the second or outer pipe 28 of the heat exchanger should be in excess of 500 degrees Fahrenheit. In a typical wet oxidation reaction, the oil will be delivered to the inlet of the insulated tubular 24 at a temperature of about 700 degrees Fahrenheit. The oil or other heat transfer fluid then flows downwardly to the open end 26 of the insulated tubular, where it is delivered to the outer pipe 28 of the heat exchanger at a temperature of about 525 to 550 degrees Fahrenheit. The fluid then flows upwardly through pipe 28 as shown by arrow 72 of FIG. 2 and heats the down-flowing fluid to be treated which contacts the outer surface of pipe 28 in pipe 32. The temperature of the oil at the top exit of the pipe 28 is about 150 degrees Fahrenheit. As described, the fluid reaction occurs in a reaction zone where temperature of the down-flowing fluid exceeds 350 degrees Fahrenheit. The preferred embodiment of the fluid treatment apparatus therefore utilizes an insulated tubular 24 to reduce the radial heat transfer from the downflowing heat transfer fluid in the insulated tubular 24 to the cooler heat transfer fluid in line 28. The details of the insulated tubular 24 are disclosed in FIG. 2. The insulated tubular includes an inner tube 120 having outer and inner surface 122 and 124, respectively, and an outer tube 126 having outer and inner surfaces 128 and 130, respectively. The inner tube 120 is preferably concentric with and telescopically nested within the outer tube 126 in spaced relation. The space 132 between the tubes is fixed and sealed with a sealing ring 134 which may be welded or otherwise secured in the space between the tubes. The space between the tubes is then evacuated and filled with an inert gas such as argon, helium and xenon. The inert gas has a low thermal conductivity, reducing the radial heat transfer through the space 132 between the tubes 120 and 126.

The heat transfer across the space 132 between the tubes is defined by the following equation:

$$Q = kA\Delta t / \Delta r$$

wherein Q is the heat transferred in btu per hour, k is the thermal conductivity, A is the area for heat transfer, $\Delta t / \Delta r$ is the radial temperature gradient. In the wet oxidation apparatus operating experimentally at Longmont, Colorado, the inner tube 120 has an inside diameter of two inches and an outside diameter of $2\frac{3}{8}$ inches. The outer tube 126 has an inside diameter of three inches and an outside diameter of $3\frac{1}{2}$ inches. Thus, $\Delta r$ is $\frac{3}{8}$ inch. In the example above, $\Delta t$ at the top of the heat exchanger is 550 degrees Fahrenheit (700 degrees F.-150 degrees F.). Thus, the temperature gradient is substantial and substantial radial heat transfer will occur in the upper portion of the fluid treatment apparatus unless the inner pipe 24 is well insulated.

The use of an insulated tubular 24 has resulted in a substantial decrease in radial heat losses, however, the insulating qualities have decreased with time. It has now been discovered that the reduction in the insulating qualities of the insulated tubular is due at least in part to the permeation of atomic hydrogen through the walls of the insulated tubular into the space 132 between the tubes. Atomic hydrogen is able to permeate the interstices of the metal tubes 120 and 126 into the space 132 between the tubes. The atomic hydrogen then combines to form hydrogen gas which cannot escape through the walls. The hydrogen gas then accumulates in the space 132 between the tubes, increasing the thermal conductivity of the gas. As described above, the space between the walls is filled with an inert gas. The insulated tubular of this invention therefore includes a hydrogen permeation barrier which reduces the flow of atomic hydrogen into the space between the tubes.

The most preferred hydrogen permeation barrier comprises a diffusion coating of aluminum on the inner and outer surfaces of both tubes, 124, 126, 128 and 130. The tubes are preferably formed of steel, such that the diffusion coating is an iron-aluminum alloy. Aluminum diffusion coatings are commonly applied to steel furnace tubes and the like to improve corrosion resistance and furnace life by a process known as "Alonizing". In the Alonizing process, the pipe is packed externally and internally with aluminum and alumina powder and placed in a furnace at about 1700 degrees Fahrenheit for three to four days. The coating is very hard and does not interfere with welding. It has now been discovered that an Alonized aluminum-iron diffusion coating substantially reduced atomic hydrogen diffusion.

The hydrogen diffusion barrier coating may also be formed by electroplating nickel on the interior and exterior surfaces of the tubes. The electroplated nickel coating also provides an excellent atomic hydrogen diffusion barrier, not quite as good as the Alonized surfaces. Finally, the hydrogen diffusion barrier may be formed by electroplating copper on the surfaces of the tubes, however, copper will interfere with welding and may adversely affect the strength properties of the tubes. Where the surface is electroplated with nickel or copper, the thickness of the coating should be approximately 0.001 mm. Comparing bare steel with a hydrogen permeation barrier coated insulated tubular, the coated insulated tubular had a hydrogen permeation rate reduced by a factor of about 1000. Comparing Alonized steel with a nickel plated steel, the permeation rate was reduced by a factor of about 10. Thus, the most preferred embodiments includes a hydrogen diffusion barrier formed by diffusion coating of aluminum, forming an iron-aluminum alloy. The hydrogen diffusion barrier substantially reduces degradation of the insulating qualities of the insulated tubular.

The method of forming an insulated tubular thus includes forming telescopically nestable steel tubes, preferably seamless tubes as shown at 120 and 126 in FIG. 2. A hydrogen permeation barrier coating is then formed on the tubes, preferably on the exterior and interior surfaces of both tubes. The tubes are then assembled in nested concentric telescopically spaced relation as shown in FIG. 2 and the space between the tubes is sealed as by sealing ring 134. The space 132 between the tubes is then evacuated and the space is filled with an inert gas, such as neon, argon or xenon. The resultant insulated tubular is not as subject to insulation degradation because the barrier reduces the permeation of atomic hydrogen, as described.

Having described the preferred embodiment of the heat exchanger, continuous fluid treatment apparatus and method of forming an insulated tubular of this invention, it will be understood that various modifications may be made to the inventions disclosed herein within the purview of the appended claims. As described, the heat exchanger and fluid treatment apparatus of this invention may be used in various applications, however, the inventions are particularly adapted for use in vertical tube or deep well reaction apparatus such as may be used for wet oxidation of municipal sludge. The apparatus may, however, be used for treatment of various contaminated or waste fluids or contaminated solid waste suspended in a fluid. The apparatus may also be used to treat or convert various materials in a fluid reaction requiring elevated temperatures and pressures. Having described the preferred embodiments of the heat exchanger, continuous fluid treatment apparatus and method of this invention, I now claim the invention as follows:

1. An elongated heat exchanger, comprising an elongated insulated tubular having an open end generally concentric with telescopically nested in and surrounded by a second pipe having a closed end adjacent said open end of said insulated tubular and communicating therewith, said insulated tubular having a first inner metal tube and a second outer metal tube generally concentric with and surrounding said first tube in spaced relation, the space between said first and second tubes sealed and filled with an inert gas, a hot heat transfer fluid received in one end of said insulated tubular and flowing through said insulated tubular, said heat transfer fluid cooling and returning through said second pipe for heating and recirculation, and a hydrogen permeation barrier on the inner and outer surfaces of said first and second tubes of said insulated tubular, said hydrogen permeation barrier comprising a metal coating selected from the group consisting of aluminum, nickel and copper, said permeation barrier reducing the flow of atomic hydrogen into said space between said first and second tubes of said insulated tubular, thereby reducing heat losses from said heat transfer fluid in said insulated tubular to the returning heat transfer fluid in said second pipe.

2. The heat exchanger defined in claim 1, characterized in that said first and second tubes of said insulated tubular are steel and said hydrogen diffusion barrier consists of a diffusion coating of aluminum on said inner and outer surfaces, forming an iron-aluminum alloy.

3. The heat exchanger defined in claim 1, characterized in that said hydrogen diffusion barrier comprises an electroplated coating selected from the group consisting of nickel and copper.

4. A continuous fluid treatment apparatus for treatment of fluids at elevated temperatures, said fluid treatment apparatus including an elongated fluid heat exchanger surrounded by fluid circulation pipes containing the fluid to fbe treated, said heat exchanger comprising a first pipe having a closed end and an insulated tubular generally concentric with and telescopically nested within said first pipe in spaced relation having an open end adjacent said closed end of said first pipe, said insulated tubular comprising generally concentric telescopically nested spaced metal tubes, the space between said tubes sealed and filled with an inert gas, a hot heat transfer fluid flowing through said insulated tubular in one direction, cooling and returning through said first pipe in the opposite direction around said insulated tubular, and said circulation pipes comprising a second pipe telescopically surrounding said first pipe in spaced relation receiving the fluid to be treated in contact with said first pipe, and a third pipe generally concentric with and surrounding said second pipe in spaced relation recirculating the treated fluid, the heat from said heat transfer fluid thereby heating said fluid to be treated, and said insulated tubular having a hydrogen permeation barrier, said hydrogen permeation barrier comprising a coating means on the exterior and interior surfaces of said nested metal tubes limiting permeation of atomic hydrogen into said space between said tubes and hydrogen gas build-up in said space, said barrier reducing heat losses from the hot heat transfer fluid in said insulated tubular to the returning heat transfer fluid in said first pipe and providing a predetermined heating zone for the fluid being treated in said second pipe adjacent said closed end of said first pipe.

5. The continuous fluid treatment apparatus defined in claim 4, characterized in that said tubes of said insulated tubular are steel and said hydrogen diffusion barrier consists of a diffusion coating of aluminum on said inner and outer surfaces, forming an iron-aluminum alloy limiting diffusion of atomic hydrogen through said tubes.

6. The continuous fluid treatment apparatus defined in claim 4, characterized in that said hydrogen diffusion barrier comprises an electroplated coating on said surfaces selected from the group consisting of nickel and copper.

* * * * *